US011015484B2

(12) United States Patent
Lepretre et al.

(10) Patent No.: US 11,015,484 B2
(45) Date of Patent: May 25, 2021

(54) ASSEMBLY FOR A SPREADER CONNECTION BETWEEN A TURBINE CASING AND A TURBINE ENGINE RING ELEMENT

(71) Applicant: Safran Aircraft Engines, Paris (FR)

(72) Inventors: Gilles Gérard Claude Lepretre, Moissy-Cramayel (FR); Thierry Guy Xavier Tesson, Moissy-Cramayel (FR); Hubert Jean-Yves Illand, Moissy-Cramayel (FR); Lucien Henri Jacques Quennehen, Moissy-Cramayel (FR); Matthieu Arnaud Gimat, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 313 days.

(21) Appl. No.: 16/018,814

(22) Filed: Jun. 26, 2018

(65) Prior Publication Data

US 2018/0371948 A1    Dec. 27, 2018

(30) Foreign Application Priority Data

Jun. 26, 2017    (FR) .................................. 1755847

(51) Int. Cl.
*F01D 25/24*    (2006.01)
*F01D 11/24*    (2006.01)

(52) U.S. Cl.
CPC ............ *F01D 25/246* (2013.01); *F01D 11/24* (2013.01); *F05D 2220/323* (2013.01); *F05D 2230/644* (2013.01); *F05D 2240/11* (2013.01); *F05D 2240/14* (2013.01); *F05D 2240/80* (2013.01);
(Continued)

(58) Field of Classification Search
CPC ...... F01D 25/243; F01D 25/246; F01D 25/26; F01D 25/265; F01D 11/14; F01D 11/16; F01D 11/18; F01D 11/20; F01D 11/22; F01D 11/24; F05D 2230/644; F05D 2240/11; F05D 2300/50212
See application file for complete search history.

(56) References Cited

U.S. PATENT DOCUMENTS 4,127,357 A     11/1978   Patterson
4,714,404 A  *  12/1987   Lardellier ............... F01D 11/22
                                                    15/171

(Continued)

FOREIGN PATENT DOCUMENTS

DE    102006012361 A1 * 10/2006 ............. F01D 25/26
FR      2 651 830 A1     3/1991
(Continued)

*Primary Examiner* — Igor Kershteyn
(74) *Attorney, Agent, or Firm* — Blank Rome LLP

(57) ABSTRACT

An assembly comprising ring sectors made of a first material, the sectors being placed circumferentially end to end and suspended from an outer casing, and radial positioning means comprising at least one annular tongue made of a different material, for fastening the ring sectors to the outer casing, by an annular support. The radial positioning means further comprise an eccentric spreader engaged on one side with said at least one annular tongue and, on the other side, with the sectorized annular element, and acting to enable the distance between the annular tongue and the sectorized annular element to be adjusted radially.

19 Claims, 4 Drawing Sheets

(52) U.S. Cl.
CPC .............. *F05D 2300/50212* (2013.01); *F05D 2300/6033* (2013.01)

(56) References Cited

U.S. PATENT DOCUMENTS

| | | |
|---|---|---|
| 7,922,445 B1 | 4/2011 | Pankey et al. |
| 2014/0271147 A1 | 9/2014 | Uskert et al. |

FOREIGN PATENT DOCUMENTS

| | | |
|---|---|---|
| FR | 2 651 831 A1 | 3/1991 |
| FR | 3 036 435 A1 | 11/2016 |

\* cited by examiner

ASSEMBLY FOR A SPREADER CONNECTION BETWEEN A TURBINE CASING AND A TURBINE ENGINE RING ELEMENT

This application claims the benefit of French Patent Application No. 1755847, filed Jun. 26, 2017, the contents of which is incorporated by reference herein.

BACKGROUND OF THE INVENTION

On a gas turbine engine for an aircraft, this invention relates to the connection between an annular tongue, made of a first material and fastened to an annular outer casing of a turbine, and a sectorized annular element, made of a second material having a coefficient of thermal expansion different from that of the first material.

The sectorized annular element may in this description typically comprise one of the following:
 ring sectors, which are placed circumferentially end to end and suspended from the outer casing, or
 outer platform sectors of blades of a distributor of said turbine,
both thus being made of said second material.

As a sectorized annular element, the turbine rings make it possible to define a portion of the outer stream of the turbine, in particular of the HP (high-pressure) turbine, whenever, in particular on dual-flow turbojets or turbofans, the turbines comprise an HP turbine followed by a LP (low pressure) turbine.

The HP turbine rings, which are parts subjected to very hot flows, are typically metal elements that need to be cooled. This has a non-negligible impact on the performance of the turbine engine since the required cooling flow is taken from the main gas flow. In addition, the use of metal limits the possibilities of increasing the temperature where the turbine is located, which could have been used to improve the performance of the turbine engine.

In addition, the fact that the coefficients of thermal expansion of the first and second materials are different implies that they deform differently, particularly under the effect of the thermal fields, which has an impact on the clearances at the above-mentioned stream and therefore on the performance of the turbine. The clearances between parts need to be managed accordingly.

Comparable differential expansion problems exist both where the outer platform sectors of blades of the HP turbine distributor are situated, and also where the first stage of the LP turbine distributors (LPD1) is situated.

Minimizing the radial clearance between a said annular tongue of a turbine and the sectorized annular element in question is therefore important, for safety and for improving the efficiency of the turbine engine.

Mounting a Pi ($\pi$)-type sectorized annular element, which may be referred to as being "pinned", i.e. with pins connecting said element to the outer casing, via said intermediate annular support, normally requires radial positioning and keeping said mounting under control over time, at cold temperatures and therefore when the engine is not running, as well as at the various operating temperatures of the engine. Such mounting between the metal pins and the bores receiving them needs to be performed at zero clearance, such that the sectorized annular element is held securely and such that the stream in which it is placed is situated radially in the correct position. Indeed, forming this stream, to the correct dimensions, significantly contributes to the performance of the turbine. Unfortunately, at least two aspects prevent such installation at zero clearance from being carried out:
 manufacturing tolerances, both on the (generally metal) pins and also in the bores in the second material: force-fitting in many cases, with corresponding local deterioration of the support,
 differential expansion in the first and second materials in response to heat; the material can suffer from brinelling or other damage.

SUMMARY OF THE INVENTION

To overcome at least some of the above problems above, the invention provides an assembly comprising:
 an annular outer casing of a turbine of an aircraft gas turbine engine,
 a sectorized annular element made of a first material and comprising one of the following:
  ring sectors placed circumferentially end to end and suspended from the outer casing, or
  outer platform sectors of blades of a distributor of the turbine,
 radial positioning means comprising at least one annular tongue for:
  fastening the ring sectors to the outer casing by means of an annular support, or
  radially positioning the outer platform sectors of the distributor blades relative to the annular tongue,
the radial positioning means further comprising an eccentric spreader engaged on one side with the annular tongue and, on the other side, with the sectorized annular element, and acting to enable the distance between the annular tongue and the sectorized annular element to be adjusted radially, wherein
 the annular tongue is made of a second material having a coefficient of thermal expansion different from that of the first material,
 the eccentric spreader comprises:
  a spreader connected to an eccentric, and
  pins mounted with clearance in passages in the sectorized annular element, and,
 in order to cause a portion of an outer circumference of at least one of the pins and a portion of an outer circumference of the passage in which the pin is mounted to bear against each other, the eccentric spreader is connected to the annular tongue by means of the eccentric, an operating rod of which, which extends parallel to an axis along which the annular tongue and the sectorized annular element extend coaxially, is engaged without clearance in a first passage in the tongue and can be operated for adjusting the radial distance, two groups of two pins of the spreader, each parallel to the axis, being mounted with at least radial clearance in some of the passages in the sectorized annular element that are spaced apart from one another circumferentially.

Thus, it is possible to minimize the ventilation necessary for operation of the sectorized annular element and thus to limit the amounts of fluid taken from the main flow of the engine, in the above-mentioned stream, and thus to increase the performance of the turbine engine. It is also possible to better manage the shape of the upper stream, in particular since the proposed solution thus also applies to the radially outer fastening portion of a turbine distributor.

In this regard, in the present application:
 the term "radial" means perpendicular to the axis X about which, for example, the turbine blades rotate;
 "circumferential" means extending about the axis X;
 "outer" and "inner" (or "outside" and "inside") respectively mean radially outer and radially inner;

"axial" means parallel to the above-mentioned axis of rotation X;

"spreader" means a device a force to be distributed uniformly, generally between two points; and "upstream" and "downstream" are axial positions with reference to the general direction of movement of gas in the turbine engine.

Preferably, the eccentric spreader has pins mounted with clearance in the passages in the sectorized annular element and is placed to cause a portion of an outer circumference of at least one of the pins and a portion of an outer circumference of the passage in which the pin is mounted to bear against each other.

Thus, by establishing initial clearance between the pin carried by the annular tongue and the holes formed in the sectorized annular elements when the engine is cold (about 20° C.), it is possible to compensate for the effects due to the differential expansion. This clearance is reduced almost to zero when the engine is running (hot) and thus becomes compatible with the initial specifications which range from 1 millimetre (mm) to a few hundredths of a millimetre. The cold clearance is reduced by acting on an adaptive system put under stress such that the annular elements are pressed against the tops of the pins, thus reducing the relative clearance almost to zero.

The/each eccentric spreader serves to procure the above-mentioned contact during assembly (therefore "cold", at ambient temperature, with the turbine engine turned off). Once the radial positioning is achieved, the/each eccentric spreader is locked. Permanent contact is thus achieved, irrespective of the operating temperatures (that may range from −30° C. to 600° C.).

The proposed assembly notably makes it possible to reduce (ideally to zero) the cold radial clearance between the sectorized annular elements and the annular tongue. As regards hot setting, it is obtained by linear assembly of the surfaces of contact between the spreader pins, the oblong passages in the ring sector, outer faces or planes thereof and the plane inner bearing faces (261a,261b below) of the lugs situated on the annular tongues of the casing. The eccentric spreader in question also makes it possible to achieve contact without constraining the manufacture of the sectorized annular elements.

By making provision for the eccentric spreader:

to comprise a spreader and an eccentric, and to be connected to the annular tongue by means of the eccentric, the operating rod of which, which extends parallel to the axis along which the annular tongue and the sectorized annular element extend coaxially, is engaged without clearance in a first passage in the annular tongue and can be operated for adjusting the radial distance, two groups of two pins of the spreader, each parallel to the axis, being mounted, with a least a radial clearance, in some of the passages, that are spaced apart from on another circumferentially, in the sectorized annular element, it is possible, in addition, to distribute the bearing surfaces appropriately and accurately at preferred places, thereby further facilitating keeping the stresses under control.

Notable among the advantages of the proposed assembly is the importance of the vice system device used. The pin is mounted with clearance in the bore. This clearance remains when the engine is hot, thereby helping to overcome the obstacles of the manufacturing tolerances and of the differential expansions that can damage the second material; the pin is pressed against the upper surface of the bore; in order to maintain this position (which cannot be done naturally because of the pin/bore mounting clearance), the (plane inner bearing faces of the) lugs of the annular tongues of the (connect to the) casing that are offset relative to the pins in order to be on a common tangential straight line with the bearing surfaces (260a,260b below) are used so as to create the vice system with the top of the pin.

To facilitate flexible and permanent adaptation of the assembly to any operating conditions encountered, it is further proposed that resilient return means be provided for return in a radial direction, which means radially urge the spreader towards the eccentric, and therefore the sectorized annular element towards the annular tongue.

Using such flexible elements (the resilient return means may be washers), in addition to offering an additional degree of rotation on the spreader, makes it possible to compensate for unwanted thermal gradients related to the different metal components of the spreader and of the casing and for the coefficients of expansion of those components not being kept under control.

Preferably, the eccentric spreader further comprises a radial tie-rod connecting the spreader to the eccentric, and on which it is possible for the eccentric to act radially, for radially adjusting the two groups of two other pins.

Again, for improving balancing of the forces, furthermore often possible in highly varied operating conditions in terms of temperature and mechanical stresses, it is also proposed that the two groups of other pins be engaged, in groups, respectively in the passages in the sectorized annular element, with those passages themselves being engaged respectively with first and second traction fingers mounted to pivot relative to the spreader about an axis perpendicular to the radial adjustment direction and to the axis along which the annular tongue and the sectorized annular element extend coaxially.

In this regard, it could be preferable for the other pins of each of the two groups to be engaged in respective ones of the first and second traction fingers to be able to turn about respective axes parallel to the axis along which the annular tongue and the sectorized annular element extend coaxially.

For the same reasons, it is also proposed that the radial tie-rod and the spreader to be pivotally interconnected to enable them to turn relative to each other about an axis parallel to the radial adjustment direction.

The degrees of liberty cited above, when considered individually or collectively, further the expected contacts between the annular tongue and the sectorized annular element.

Provision is also made for each of the two pins of each group to be able to be mounted, also with a circumferential clearance, into the passage that receives it.

This makes it possible to fine-tune the guidance of the moving parts and thus to further balance the forces.

Two other considerations have also been taken into account:

firstly, that, next to the eccentric spreader, and for purposes of angular setting, another pin be provided that extends parallel to the axis along which the annular tongue and the sectorized annular element extend coaxially, and that is engaged:

without clearance in another passage in the annular tongue, and, with radial clearance, through an orifice in the sectorized annular element;

or that the other pin be situated radially below the eccentric and circumferentially between the two pins of one of the pin groups, halfway between them.

With this additional pin, it is possible to procure angular locking of the positioning of the sectorized annular element in the stream. Its positioning in the centre enables the differences in length between the sectors and the casing (its annular tongues) to be distributed symmetrically, and thus enables a more homogenous stream shape to be obtained.

Considering the targeted preferred applications, it has equally been provided in particular:

that the first material of the annular tongue of the turbine be either a metal or a metal alloy, and that the second material of the sectorized annular element contain a ceramic matrix composite.

Indeed, the difference in coefficients of thermal expansion between the two materials can be critical under certain temperature and/or pressure conditions.

In addition to the above-described assembly, the invention also provides an aircraft gas turbine engine including the assembly, with all or some of the above-mentioned characteristics.

BRIEF DESCRIPTION OF THE DRAWINGS

The invention will, if necessary, be better understood and other details, characteristics and advantages of the invention will become apparent on reading the following description given by way of non-limiting example and with reference to the accompanying drawings, in which.

DETAILED DESCRIPTION OF THE PREFERRED EMBODIMENTS

Figure 1:
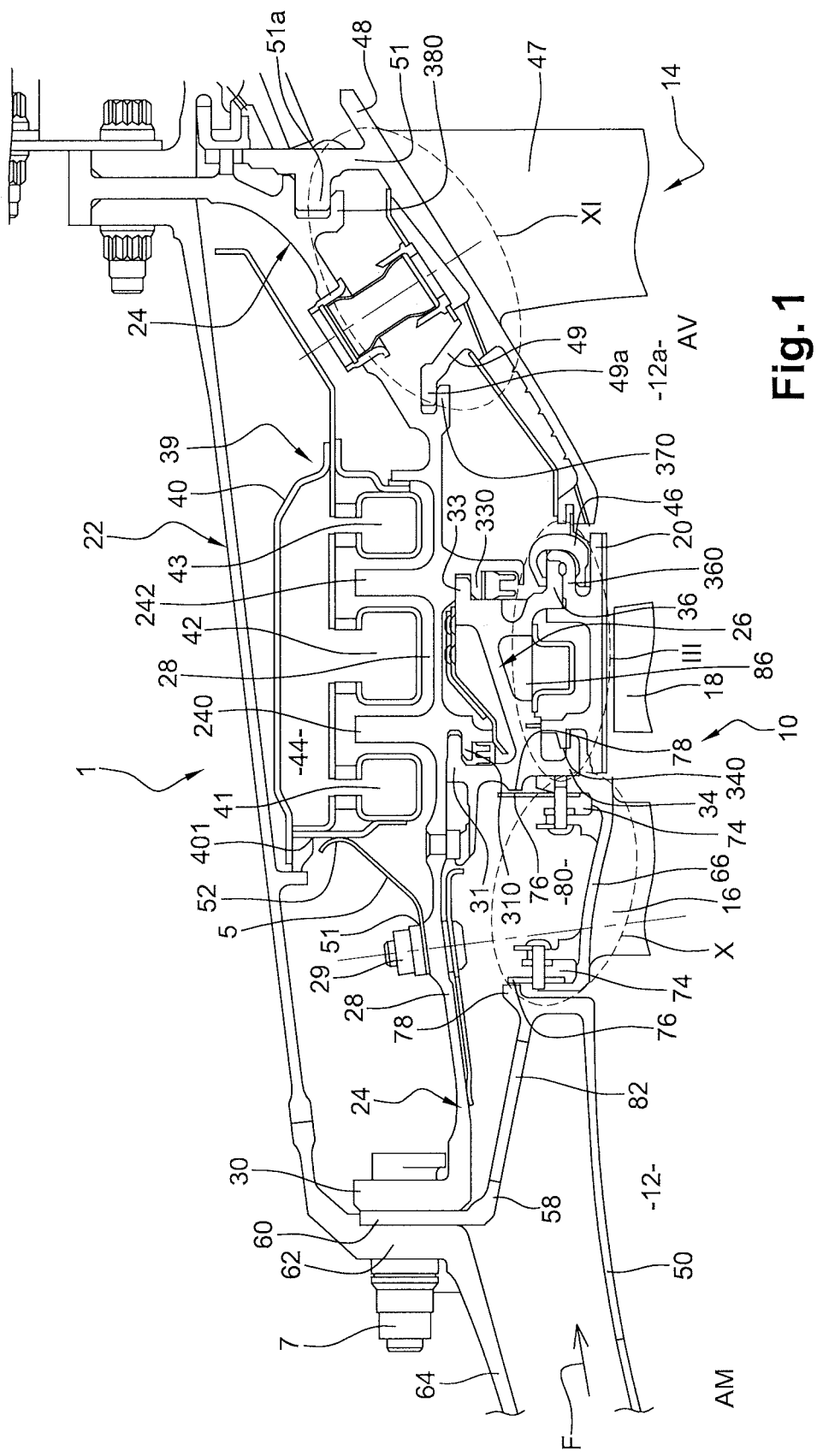
FIG. 1 is a fragmentary diagrammatic section view (on axis X) showing a portion of the aircraft gas turbine engine as mounted on an aircraft.

FIG. 1 shows part of a known turbine engine 1, such as an aircraft turbojet, turbofan, or turboprop comprising a high-pressure turbine (HP) 10 placed axially (along axis X) downstream (AV) from a combustion chamber 12, and upstream (AM) from a low-pressure turbine (LP) 14 of the turbine engine.

The combustion chamber 12 comprises a circularly symmetrical outer wall 50 connected at its downstream end to a radially inner end of a frustoconical wall 58 which, at its radially outer end, has a radially outer annular flange 60 for fastening to a corresponding annular flange 62 of an outer casing 64 of the chamber. The high-pressure turbine 10 in the example comprises a single turbine stage with a distributor 16 formed by an annular row of fixed straightening blades, and a bladed wheel 18 mounted to rotate downstream from the distributor 16. The low-pressure turbine 14 comprises a plurality of turbine stages with each stage comprising a distributor and a bladed wheel. Only the distributor 47 of the upstream low-pressure stage is visible in FIG. 2. Its blades are those of the first stage of distributors, or LPD1. The rotor blades 18 and the distributors 16,47 extend into the gas stream 12a to which the combustion chamber 12 is connected downstream. The wheel 18 of the high-pressure turbine 10 turns about the longitudinal axis X of the turbine engine, inside a substantially cylindrical assembly of ring sectors 20 arranged circumferentially end to end and suspended from an outer casing 22 of the turbine by means of an annular support 24. On its inner periphery, this annular support 24 is provided with fastening means 26 referred to as an annular tongue 26 for fastening the ring sectors 20, and has a wall 28 extending upstream and outwards and that is connected at its radially outer end to a radially outer annular flange 30 for fastening to the outer casing 22 of the turbine. A flange 60 is interposed axially between the flange 30 and a flange 62 of the turbine casing 22 and axially clamped between these flanges by any appropriate means of the nut-and-bolt type 7.

On their outer periphery, the fastening means 26 are provided with (first) radial annular walls 31,33, respectively upstream and downstream walls, which define rims (extending downstream in this example), and cooperate with (are suspended from) circumferential hooks 310,330 provided on the inner periphery of a portion of the wall 28 of the annular support 24.

On its inner periphery, the annular tongue 26 also has two other (or second) radial annular walls 34,36, respectively upstream and downstream walls, which define rims (extending downstream in this example) that cooperate with circumferential hooks 340,360 provided at the upstream and downstream ends of the ring sectors 20. A C-section annular locking member 46 is engaged axially from downstream over the cylindrical downstream rim 36 and over the downstream hooks 360 of the ring sectors to lock the assembly.

Further upstream, the wall 28 of the annular support 24 cooperates with the frustoconical wall 58 of the chamber to define an annular enclosure 80 that is fed with ventilation and cooling air (arrow F) through orifices 82 formed in the frustoconical wall 58.

At each of its upstream and downstream ends, the outer sectorized platform 66 of the distributor 16 is provided with an annular groove 74 opening radially outwards. Annular sealing gaskets 76 are housed in these grooves 74 and cooperate with cylindrical ribs 78 formed respectively on the frustoconical wall 58 and on an upstream radial wall of the fastening means 26, for preventing gas from flowing from the stream 12/12a of the turbine, radially, outwards towards the outside of the outer platform sectors 66, and conversely, to prevent air from flowing from the enclosure 80 radially inwards, into the stream of the turbine.

In addition, in order to improve the efficiency of the turbine, it is necessary to reduce the radial clearance between the tips of the moving blades 18 and the rings 20 to as small an amount as possible. An additional clearance control device 39 is provided that comprises a circular control box 40 surrounding the fixed ring 20, and more precisely the annular support 24.

Depending on the operating regimes of the turbine engine, the control box 40 is designed to cool or heat the upstream fin 240 and the downstream fin 242 of the annular support 24 by discharge (or impact) of air on the fins. Under the effect of this air discharge, the annular support 24 contracts or expands, thus diminishing or increasing the diameter of the fixed ring segments 20 of the turbine in order to adjust the clearance at the tips of the blades 18. The control box 40 supports annular air circulation manifolds 41, 42 and 43 that surround the above-mentioned portion of the wall 28 of the annular support 24. The control box is also provided with an air collector tube that surrounds the manifolds 41, 42, and 43 and feeds them with air through ducts 44.

Despite these mounting solutions in particular, there is still a persistent necessity to minimise the radial clearances between the annular tongue (referenced below as 26 or 26') of the turbine in question and the sectorized annular element in question (in this example, the ring sectors referenced 20 below, or at least one of the outer platforms 48,66) for safety reasons and in order to improve the efficiency of the turbine engine, especially if the material of which the annular tongue is made is a metal or a metal alloy and the second material of the sectorized annular element contains a ceramic matrix composite (CMC).

FIGS. 2 to 6 thus show manners different from what is described above of mounting the ring sectors 20 with the annular support 24, via the annular tongue 26 or 26' and radial positioning means 125,125'.

Figure 7:
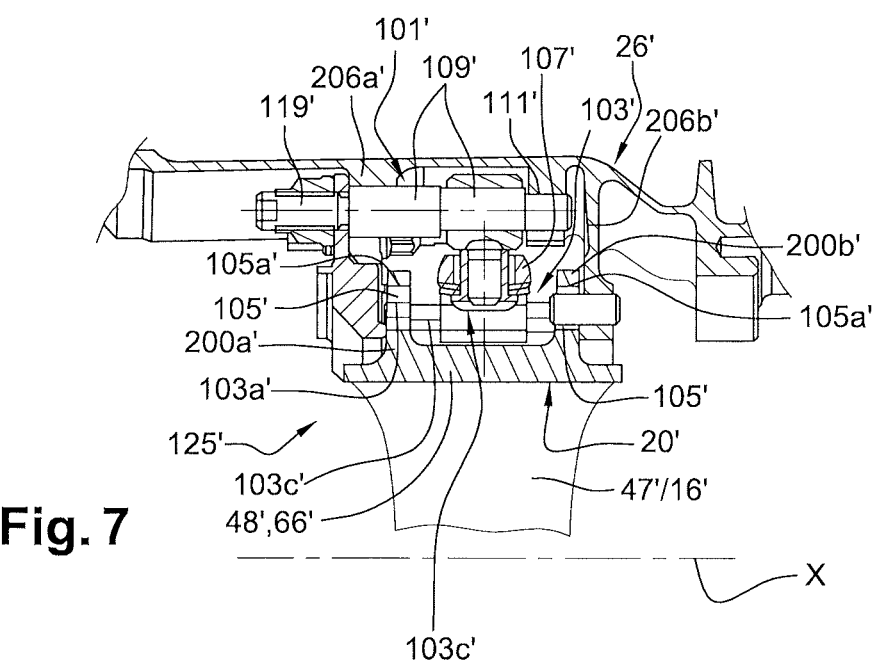
FIG. 7 is a view similar to the FIG. 4 view but showing another embodiment of the invention in zone X or XI of FIG. 1, also with an annular tongue (26' below) of which only the radially inner portion is shown.

These figures thus show a different manner from what is described above of mounting with the annular support 24, via at least one annular tongue 26 or 26':
  either the ring sectors 20 (solution shown in FIGS. 2 to 5),
  or the outer platform sectors 48 and/or 66 of blades of a turbine distributor (solution shown in FIG. 7).

It is thus proposed in a solution of the invention to connect together the ring sectors 20 or 20' and the annular tongue 26 or 26', and in particular to suspend the ring sectors from the annular tongue, via radial positioning means 125 or 125', which have eccentric spreaders 101 or 101' (typically one per ring sector or platform sector) engaged:
  on one side with the annular tongue 26 or 26',
  and on the other side with the sectorized annular element in question.

These eccentric spreaders act to enable the distance between the annular tongue 26 or 26' and the sectorized annular element in question to be adjusted radially.

Figure 2:
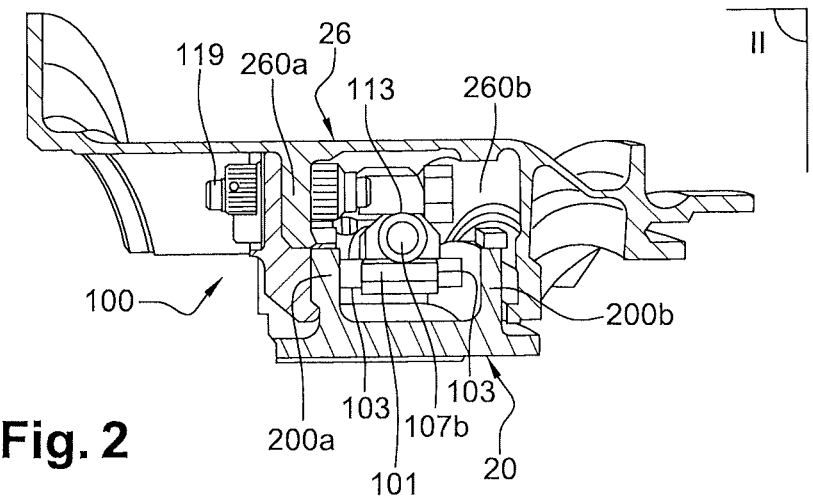
FIG. 2 is a view in perspective and on the same section plane II as in FIG. 4, and showing the embodiment shown in FIG. 4.

A practical and effective configuration consists, in the first solution shown in FIGS. 2 to 5, in making provision for each eccentric spreader 101 to have pins 103 mounted with clearance (J) in axial passages 105 (axis X, preferably in two passages sharing the same axis; see FIG. 2) of the ring sector 20 in question, and to be placed to cause a portion of the outer circumference 103a of at least one of the pins and a portion 105a of the outer circumference of the passage 105 in which the pin is mounted to bear against each other. Coaxially to each passage 105, the pin 103 in question is, at least at one axial end, engaged without clearance in an orifice 106 in the annular tongue 26.

Thus, the eccentric spreaders serve to procure the desired bearing during mounting (therefore cold), as explained below, with reference to FIGS. 8 and 9. Once the radial positioning is achieved, the eccentric spreaders are locked. Permanent contact is thus achieved, irrespective of the operating temperatures (that may range from −30° C. to 600° C.).

For connecting together each ring sector 20 and the annular tongue 26, each of these two elements is provide with two radial tongues 200a, 200b; 206a, 206b (FIGS. 2,4), which are sectorized for the ring sectors 20 and non-sectorized for the annular tongue 26. Radially offset, each orifice 106 is formed in the radial tongue 206b, while the spreader 107, together with its operating rod 119, passes through the radial tongue 206a.

In this regard, it is therefore advisable for the eccentric spreader 101 to comprise a spreader 107 and an eccentric 109, and to be connected to the annular tongue 26 via the eccentric 109, the operating rod 119 of which, which extends parallel to axis X, is engaged without clearance in at least a first axial passage 111 in the annular tongue 26 and is operable for adjusting the radial distance J, two groups (103b,103c) of two of the pins 103 of the spreader, with each one parallel to the axis X, some of which are mounted with at least the radial clearance J in the passages 105 in the annular tongue 26 that are circumferentially spaced apart from one another.

More precisely, the solution presented here is such that, for the reasons already mentioned above, the eccentric spreader 101 further comprises means 115, such as two superposed resilient return washers, for urging the ring sector in question to return radially towards the annular tongue 26. The means 115 bear radially against a rim 116, in the adjustment direction R. In addition, a radial tie-rod 113, which is threaded in this example, is provided and the eccentric 109 acts radially on it, for radially adjusting the two groups of two other pins 103b,103c. Thus, the eccentric 109 passes through the radial tie-rod 113 (generally without clearance) along an axis (which may be axis X) that is perpendicular to the radial adjustment direction R.

In this way, fastened to the spreader 107 (that it holds radially), the radial tie-rod 113 provides a radial connection between the spreader 107 and the eccentric 109. Any change in the angular position of the eccentric 109 about its axis is transmitted radially by the radial tie-rod 113 to the spreader 107, and therefore to the pins 103 (103b,103c, 103b',103c') carried by the spreader 10, thereby enabling their radial positions to be adjusted, and thus enabling the relative radial position between the sectorized annular element and the annular tongue (26,26') to be adjusted; see FIGS. 8,9.

Placed in a radially inner position relative to the eccentric 103, the resilient return means 115 absorb the radial shocks and urge the eccentric outwards.

In particular for reasons of balance, as indicated above, the two groups of other pins 103b,103c are, in groups, respectively engaged in the axial passages 105 in the ring sector 20 in question. And these passages 105 are themselves engaged with (receive) respective ones of first and second traction fingers 117a, 117b (FIG. 6) mounted to pivot relative to two arms 107a,107b of the spreader 107, about an axis Y perpendicular to the radial adjustment direction R and to the axis X (FIG. 4) along which the annular tongue 26, the outer casing 22 and the sectorized annular element in question (in this example the ring sector 20) extend coaxially. Two washers 118a,118b welded or otherwise bonded respectively to the ends of the rods 107a,107b retain the traction fingers 117a,117b (FIG. 6) along the axis Y.

In addition, in the preferred solution presented, the other pins 103b,103c of each of the two groups are pivotally engaged in the respective first and second traction fingers 117a,117b, so that they can turn about respective axes X1, X2 (FIG. 6), each of which is parallel to the axis X along which the annular tongue 26, the outer casing 22 and the sectorized annular element in question extend coaxially.

Also for balancing the forces, provision is made for the radial tie-rod 113 and the spreader 107 to be pivotally mounted together so that they can rotate relative to each other about an axis parallel to the radial adjustment direction R. For this purpose, in the direction R, the radial tie-rod 113 passes through the spreader 107 and is fastened on the other side, to an end-piece 116a that has a rim 116, such that the means 115 are interposed and radially stressed between this rim 116 and the spreader.

Figure 5:
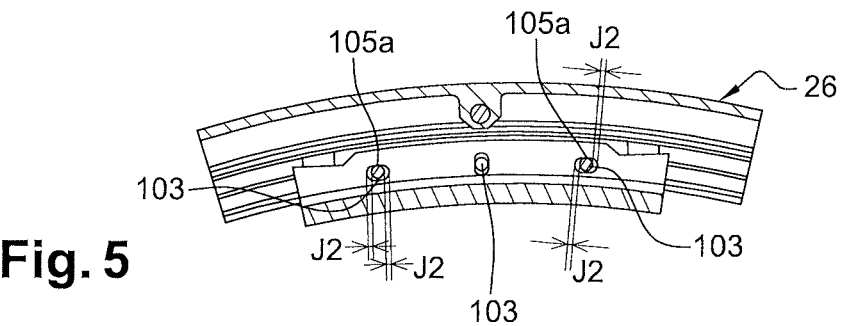
FIG. 5 corresponds to section V-V of FIG. 4.
Figure 6:
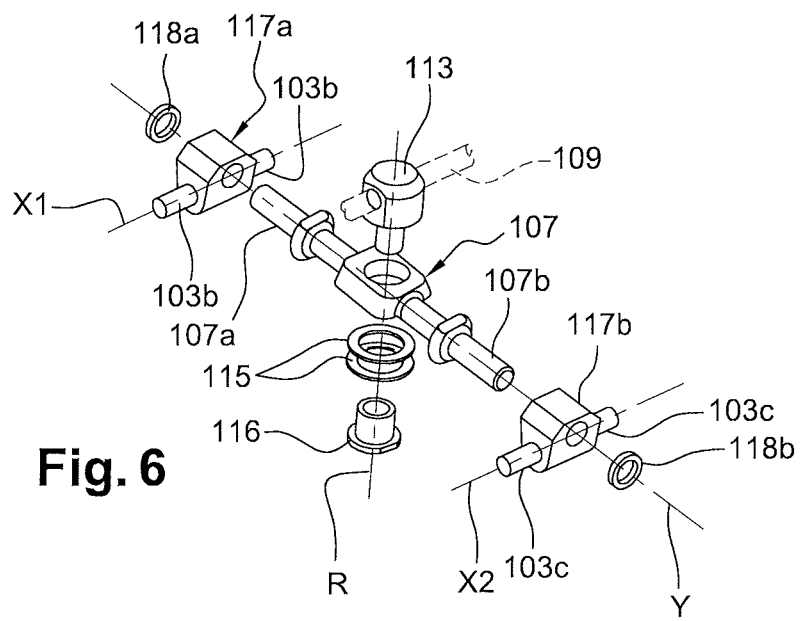
FIG. 6 is an exploded view of the eccentric spreader.

In addition, for optionally taking up the forces angularly or circumferentially, the two (other) pins 103b,103c of each group are, in this example, each mounted in the passage 105 that receives it also with circumferential clearance J2; see FIG. 5.

And to this same end, as well as for angular setting, it could be preferable, for at least some of the ring sectors 20, and next to the eccentric spreader 101, to provide another pin 103e extending parallel to the axis X and that is engaged:

without clearance in another passage 106 in the annular tongue 26, and, with radial clearance J3 (FIG. 4), through another orifice 105 in the sectorized annular element in question, which is the ring sector 20 in this example.

Figure 3:
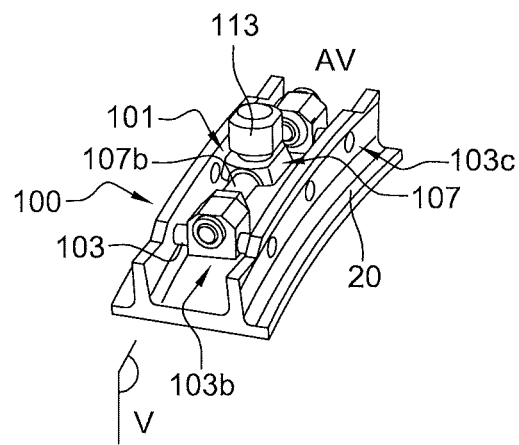
FIG. 3 is a perspective view of a sector of annular element, with an eccentric spreader but without the turbine annular tongue.
Figure 4:
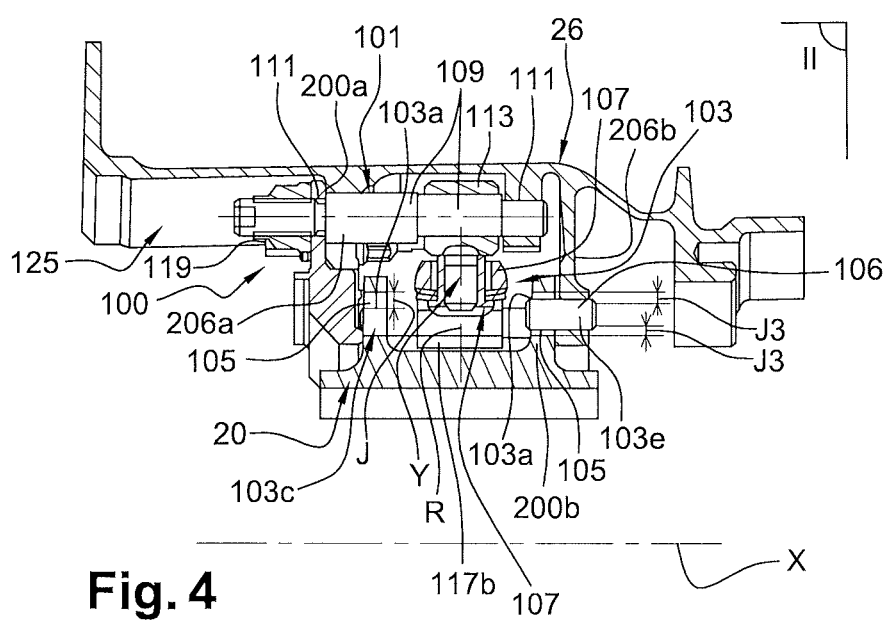
FIG. 4 is a local section view on the same section plane as FIG. 1 showing an embodiment of the invention in zone III of FIG. 1 with, as in all the FIGS. 2-7, an annular tongue (26 below) of which only the radially inner portion is shown.

In practice, it is recommended that, if this other pin 103e is provided, either, as shown in FIGS. 3 and 5, it be located radially under the eccentric 109 and circumferentially between the two pins 103b,103c of one of the groups of pins, circumferentially halfway between them.

Using the above solution for a connection having radial positioning, adaptable to accommodate changes in temperature, between outer platform sectors 48',66' of blades of a turbine distributor and an annular tongue 26', is shown in FIG. 7.

As can be seen, the same means or the means providing the same functions as those of the embodiment in FIGS. 2 to 5 and applied to the example in FIG. 1 are referenced identically except for the addition of the ' (prime) symbol; see the elements referenced 103',103a',103c',105',105a', 107',109',111',119', 47'/16'.

The transverse branch that is present in the radially inner portion of the radial branches 200a',200b' can serve as (part of) the outer platform for the distributor blades in question. The outer platform sectors 48 in FIG. 1 with their radial annular walls 49,51 (i.e. with their annular walls 49,51 having radial components) could thus be replaced with the radial branches 200a',200b', and the hooks 370, 380 of the annular support 24 of FIG. 1 could be replaced with the radial branches 206a',206b' of the annular tongue 26', and the annular tongue could itself then be part of the annular support 24.

Figure 8:
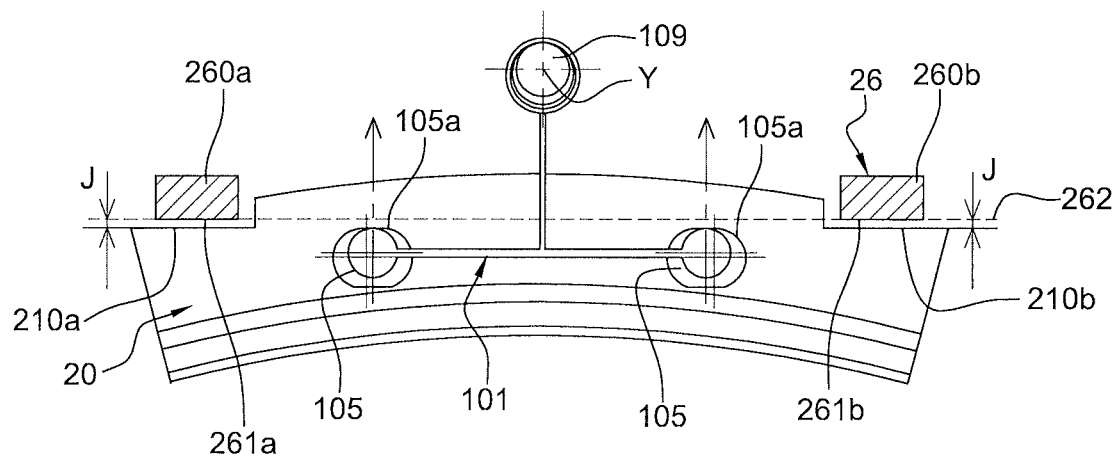
FIGS. 8 and 9 show the operating mode of the general solution of the invention.
Figure 9:
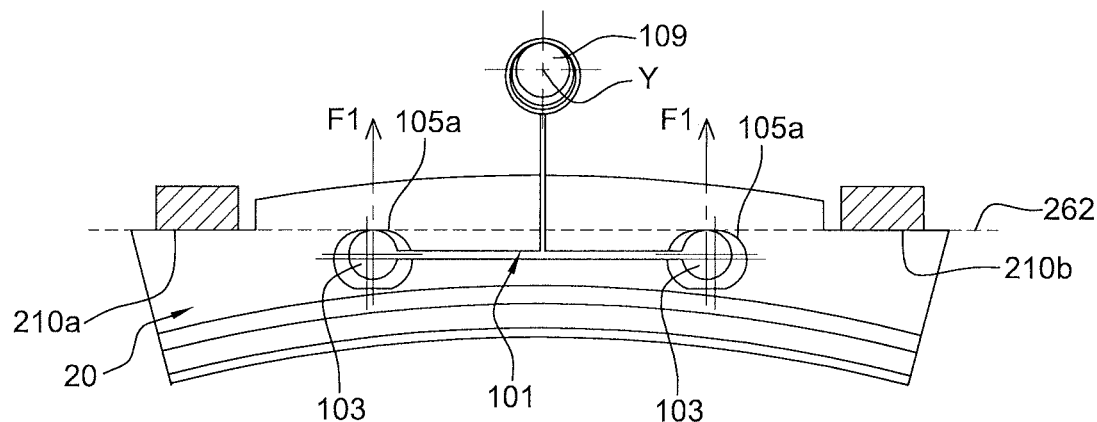

FIGS. 8,9 clearly show the operating principle chosen in this example, respectively before and after clamping via the eccentric: The sectorized annular element in question, such as the ring sectors 20 in the example, is (are) pressed, in plane bearing surface configurations, against the inner faces 261a,261b of the lugs 260a, 260b situated on the annular tongues, 26 in this example, (for fastening to the outer casing 22 or for radially positioning the outer platform sectors 48,66 of the distributor blades). This is obtained through the clamping force exerted, radially outwards, by the eccentric spreader, 101 in the example, in association with the rotation of the eccentric (109 in the example): Through the rotation of its operating drum (119 above), the rotation of the eccentric about its axis X causes a radial force FI to be applied to the spreader, via the radial tie-rod 113. The radial clearance J that, prior to clamping, exists between the plane bearing surfaces, such as 210a,210b of the sectorized annular element in question, 20, (FIG. 8) has disappeared; The complementary bearing surfaces 210a, 210b and 260a, 260b are pressed one against the other in pairs, along a contact line referenced 262 in FIGS. 8,9. This contact line 262 is situated at the level of the outer faces 105a of the oblong passages, such as 105, of each sector of the sectorized annular element.

The definition of the stream 12 is therefore controlled at the level of the zones of contact between the ring sectors 20 and the lugs.

The guarantee of clamping being maintained regardless of temperature conditions, is obtained by the alignment along line 262 of the contact zones situated:

firstly, at the pins, such as 103, of the spreader with the outer faces, such as 105a, of the oblong passages, such as 105, of each sector of the sectorized annular element, and secondly, at the lugs 260a,260b of the tongues 26 of the casing with the plane outer zones of the tongues or bearing surfaces, such as 200a,200b, of the sectors.

Regarding the length differential associated with the thermal gradients and coefficients of expansion that are different between the two materials in question (metal/CMC for the case in point), it is insignificant in relation to the initial clamping described in detail above, which is, in addition, maintained during all flight phases.

Furthermore, apart from offering an additional degree of rotation on the spreader, the addition of resilient washers 115 makes it possible to compensate for the unwanted thermal gradients associated with the different metal components of the eccentric spreader (101,101') and (of the tongues 26) of the casing and for the expansion coefficients of the components not being controlled.

The invention claimed is:

1. A turbine of an aircraft gas turbine engine, the turbine comprising:

an annular outer casing arranged around an axis, a sectorized annular element made of a first material and comprising ring sectors placed circumferentially around said axis, end to end and suspended from the outer casing, radial positioning means disposed in the turbine and comprising at least one annular tongue for fastening the ring sectors annular to the outer casing by means of an annular support, the radial positioning means further comprising an eccentric spreader engaged on one side with said at least one annular tongue and, on another side, with the sectorized annular element, and acting to enable a radial distance between said at least one annular tongue and the sectorized annular element to be adjusted radially to said axis, wherein:

said at least one annular tongue is made of a second material having a coefficient of thermal expansion different from that of the first material, the eccentric spreader comprises a spreader connected to an eccentric, and pins individually mounted in a first passage passing through the second material of said at least one annular tongue and, with clearance, in a second passage passing through the first material of the sectorized annular element, and in order to cause a portion of an outer circumference of at least one of said pins and a portion of an outer circumference of the passage, in which said at least one of the pins is mounted, to bear against each other, the eccentric spreader is connected to said at least one annular tongue by means of the eccentric, an operating rod of the annular tongue extends parallel to said axis along which said at least one annular tongue and the sectorized annular element extend coaxially, and is engaged without clearance in a third passage in the second material of said at least one annular tongue and can be operated for adjusting said radial distance, and two groups of two pins of said pins of the eccentric spreader, each parallel to said axis, being mounted with a radial clearance in some of said second passages in the first material of the sectorized annular element that are spaced apart from one another circumferentially around said axis.

2. The turbine of claim 1, wherein the eccentric spreader further comprises a radial tie-rod connecting the spreader to the eccentric and on which the eccentric acts radially, for radially adjusting said two groups of two pins of said pins of the eccentric spreader.

3. The turbine of claim 1, which further comprises radial resilient return means, which radially urge the spreader back towards the eccentric, and therefore, the sectorized annular element back towards said at least one annular tongue.

4. The turbine of claim 1, wherein said two groups of two pins of said pins of the eccentric spreader are, in groups, respectively engaged in passages in the sectorized annular element that are themselves engaged respectively with first and second traction fingers mounted to pivot relative to the spreader about an axis perpendicular to said radial adjustment direction and to said axis along which said at least one annular tongue and the sectorized annular element extend coaxially.

5. The turbine of claim 4, wherein said pins in each of the two groups of two pins of said pins of the eccentric spreader are pivotally engaged in respective ones of the first and second traction fingers to turn about respective axes parallel to said axis along which said at least one annular tongue and the sectorized annular element extend coaxially.

6. The turbine of claim 2, wherein the radial tie-rod and the spreader are pivotally interconnected to turn relative to each other about an axis parallel to said radial adjustment direction.

7. The turbine of claim 1, wherein each of said two pins of each group of the two groups of two pins of said pins of the eccentric spreader is mounted, also with a circumferential clearance, in the passage that receives it.

8. The turbine of claim 1, which further comprises, next to the eccentric spreader, and for an angular setting around said axis, another pin that extends parallel to said axis along which said at least one annular tongue and the sectorized annular element extend coaxially, and that is engaged:
    without clearance in a fourth passage in the second material of said at least one annular tongue,
    and, with radial clearance, through an orifice in the first material of the sectorized annular element.

9. The turbine of claim 8, wherein said another pin is situated radially below the eccentric and circumferentially between the two pins of one of said two groups of two pins of said pins of the eccentric spreader, halfway between them.

10. A turbine of an aircraft gas turbine engine, the turbine configured to rotate around an axis and comprising:
    an annular outer casing arranged around the axis,
    a sectorized annular element made of a first material and comprising outer platform sectors of blades of a distributor of said turbine,
    radial positioning means disposed in the turbine and comprising at least one annular tongue for positioning radially to said axis the outer platform sectors of the distributor blades relative to said at least one annular tongue, the radial positioning means further comprising an eccentric spreader engaged on one side with said at least one annular tongue and, on another side, with the sectorized annular element, and acting to enable a radial distance between said at least one annular tongue and the sectorized annular element to be adjusted radially to said axis, wherein:
said at least one annular tongue is made of a second material having a coefficient of thermal expansion different from that of the first material,
the eccentric spreader comprises a spreader connected to an eccentric, and pins individually mounted in a first passage passing through the second material of said at least one annular tongue and, with clearance, in a second passage passing through the first material of the sectorized annular element,
in order to cause a portion of an outer circumference of at least one of said pins and a portion of an outer circumference of the passage, in which said at least one of the pins is mounted, to bear against each other, the eccentric spreader is connected to said at least one annular tongue by means of the eccentric, an operating rod of the eccentric spreader extends parallel to said axis along which said at least one annular tongue and the sectorized annular element extend coaxially, and is engaged without clearance in a third passage in the second material of said at least one annular tongue and can be operated for adjusting said radial distance, and two groups of two pins of said pins of the eccentric spreader, each parallel to said axis, are mounted with a radial clearance in some of said second passages in the first material of the sectorized annular element that are spaced apart from one another circumferentially around said axis.

11. The turbine of claim 10, wherein the turbine is a high pressure turbine of the aircraft gas turbine engine.

12. The turbine of claim 1, wherein the turbine is a high pressure turbine of the aircraft gas turbine engine.

13. The turbine of claim 10 which further comprises, next to the eccentric spreader, and for angular setting around said axis, another pin that extends parallel to said axis along which said at least one annular tongue and the sectorized annular element extend coaxially, and that is engaged:
    without clearance in a fourth passage in the second material of said at least one annular tongue, and,
    with radial clearance, through an orifice in the first material of the sectorized annular element.

14. An assembly for an aircraft gas turbine engine having a turbine configured to rotate around an axis, the assembly comprising:
    an annular outer casing arranged around the axis,
    a sectorized annular element arranged coaxially around said axis, made of a first material and comprising outer platform sectors of blades of a distributor of said assembly,
    radial positioning means disposed in the assembly and comprising at least one annular tongue arranged coaxially around said axis for positioning radially to said axis the outer platform sectors of the distributor blades relative to said at least one annular tongue, the radial positioning means further comprising an eccentric spreader engaged on one side with said at least one annular tongue and, on another side, with the sectorized annular element, and acting to enable a radial distance between said at least one annular tongue and the sectorized annular element to be adjusted radially to said axis, wherein:
said at least one annular tongue is made of a second material having a coefficient of thermal expansion different from that of the first material,
the eccentric spreader comprises a spreader connected to an eccentric, and pins, each of said pins mounted through the sectorized annular element with at least one of:
 a circumferential clearance with respect to said axis, and
 a radial clearance with respect to said axis, and
in order to cause a portion of an outer circumference of at least one of said pins and a portion of an outer circumference of the passage, in which said at least one of the pins is mounted, to bear against each other, the eccentric spreader is connected to said at least one annular tongue by means of the eccentric, an operating rod of the eccentric spreader extends parallel to said axis and is engaged without clearance in a first passage in said at least one annular tongue and can be operated for adjusting said radial distance, and two groups of two of said pins of the eccentric spreader, each parallel to said axis, are mounted with clearance radial to said axis in some of said passages in the sectorized annular element that are spaced apart from one another circumferentially around said axis.

15. The assembly of claim 14, wherein at least some of the pins are mounted with clearance through the sectorized annular element with only said circumferential clearance with respect to said axis, and at least some other pins are mounted with clearance through the sectorized annular element with only said radial clearance with respect to said axis.

16. The assembly of claim 14, wherein the circumferential clearance allows movement of the respective pin in a circumferential direction with respect to said axis and the radial clearance allows movement of the respective pin in a radial direction with respect to said axis.

17. An assembly for an aircraft gas turbine engine having a turbine configured to rotate around an axis, the assembly comprising:
 an annular outer casing arranged around an axis,
 a sectorized annular element arranged coaxially around said axis, made of a first material and comprising ring sectors placed circumferentially around said axis, end to end, and suspended from the outer casing,
 radial positioning means disposed in the assembly and comprising at least one annular tongue arranged coaxially around said axis for fastening the ring sectors to the annular outer casing by means of an annular support arranged around said axis, the radial positioning means further comprising an eccentric spreader engaged on one side with said annular tongue and, on another side, with the sectorized annular element, and acting to enable a radial distance between said at least one annular tongue and the sectorized annular element to be adjusted radially to said axis,
wherein:
said at least one annular tongue is made of a second material having a coefficient of thermal expansion different from that of the first material,
the eccentric spreader comprises a spreader connected to an eccentric, and pins, each of said pins mounted through the sectorized annular element with at least one of:
 a circumferential clearance, with respect to said axis, and
 a radial clearance with respect to said axis, and
in order to cause a portion of an outer circumference of at least one of said pins and a portion of an outer circumference of the passage, in which said at least one of the pins is mounted, to bear against each other, the eccentric spreader is connected to said at least one annular tongue by means of the eccentric, an operating rod of the eccentric spreader extends parallel to said axis and is engaged without clearance in a first passage in said at least one annular tongue and can be operated for adjusting said radial distance, and two groups of two pins of said pins of the eccentric spreader, each parallel to said axis, are mounted with radial clearance in some of said passages in the sectorized annular element that are spaced apart from one another circumferentially around said axis.

18. The assembly of claim 17, wherein at least some of the pins are mounted with clearance through the sectorized annular element with only said circumferential clearance with respect to said axis, and at least some other pins are mounted with clearance through the sectorized annular element with only said radial clearance with respect to said axis.

19. The assembly of claim 17, wherein the circumferential clearance allows movement of the respective pin in a circumferential direction with respect to said axis and the radial clearance allows movement of the respective pin in a radial direction with respect to said axis.

* * * * *